US010027039B1

(12) United States Patent
Smith

(10) Patent No.: US 10,027,039 B1
(45) Date of Patent: Jul. 17, 2018

(54) THREADLESS GROUNDING BUSHING WITH REMOVABLE SPACER

(71) Applicant: Bridgeport Fittings, Inc., Stratford, CT (US)

(72) Inventor: Lawrence J. Smith, Stamford, CT (US)

(73) Assignee: BRIDGEPORT FITTINGS, INC., Stratford, CT (US)

( * ) Notice: Subject to any disclaimer, the term of this patent is extended or adjusted under 35 U.S.C. 154(b) by 0 days.

(21) Appl. No.: 15/667,096

(22) Filed: Aug. 2, 2017

Related U.S. Application Data

(63) Continuation-in-part of application No. 15/584,547, filed on May 2, 2017.

(51) Int. Cl.

| | |
|---|---|
| ***H02G 3/18*** | (2006.01) |
| ***H01R 4/66*** | (2006.01) |
| ***H01R 4/30*** | (2006.01) |
| ***H01R 4/60*** | (2006.01) |

(52) U.S. Cl.
CPC ............... *H01R 4/66* (2013.01); *H01R 4/305* (2013.01); *H01R 4/60* (2013.01)

(58) Field of Classification Search
CPC .......... H02G 3/22; H02G 3/06; H02G 3/0616; H02G 3/083; H02G 3/085; H01R 13/648; H01R 13/6485; H01R 4/26; H01R 4/56; H01R 4/64; H01R 4/72
USPC ...................... 174/664–666, 59, 78; 439/100
See application file for complete search history.

(56) References Cited

U.S. PATENT DOCUMENTS 2,947,800 A * 8/1960 Badeau ................ H02G 3/0683 174/665
3,492,625 A * 1/1970 Menashe .................. H01R 4/60 174/51
4,189,198 A * 2/1980 Reichman ................ H01R 4/64 439/100
4,806,108 A * 2/1989 Meinhardt ............... H01R 4/64 439/100
5,355,109 A 10/1994 Yamazaki
D408,790 S 4/1999 Kiely et al.
5,929,383 A * 7/1999 Marik .................... H02G 15/04 174/78
6,840,782 B1 1/2005 Borden et al.
6,881,901 B2 4/2005 Egan
7,078,623 B1 7/2006 Sheehan
7,182,611 B2 2/2007 Borden et al.
(Continued)

*Primary Examiner* — Hae Moon Hyeon
(74) *Attorney, Agent, or Firm* — Ware, Fressola, Maguire & Barber LLP

(57) ABSTRACT

A threadless grounding bushing for placement on an end of an EMT or rigid electrical conduit has a bushing body with a first portion with an inner smooth cylindrical surface dimensioned for receipt of a rigid conduit; a second portion with a central bore for the passage of conductors therethrough, the second portion dimensioned to form a stop relative to a terminating end of a rigid conduit or EMT received in the first portion; at least one set screw that extends through the first portion to make contact with the EMT or rigid conduit; a lug secured to the bushing body having an opening to secure a ground conductor thereto; and a removable spacer with an inner surface corresponding to the outer surface of an EMT and having an outer surface corresponding to the inner smooth cylindrical surface of the first portion of the bushing body.

28 Claims, 7 Drawing Sheets

(56) References Cited

U.S. PATENT DOCUMENTS

| | | | | |
|---|---|---|---|---|
| D626,087 | S | 10/2010 | Kiely | |
| D633,873 | S | 3/2011 | Kiely | |
| 7,901,256 | B1 | 3/2011 | Kiely | |
| 7,915,545 | B1 | 3/2011 | Bixler et al. | |
| 7,927,157 | B1 | 4/2011 | Kiely | |
| D648,281 | S | 11/2011 | Cerasale | |
| D651,569 | S | 1/2012 | Kiely | |
| 8,106,297 | B1 | 1/2012 | Kiely | |
| D657,316 | S | 4/2012 | Kiely | |
| 8,231,392 | B2 | 7/2012 | Garvin | |
| D666,154 | S | 8/2012 | Kiely | |
| 8,410,378 | B1 | 4/2013 | Senseney et al. | |
| 8,419,449 | B1 | 4/2013 | Smith | |
| D703,519 | S | 4/2014 | Senseney et al. | |
| 8,809,680 | B2 | 8/2014 | Kiely | |
| 8,882,517 | B2 * | 11/2014 | Smith | H01R 4/64 439/92 |
| 8,899,998 | B2 * | 12/2014 | Pyron | H01R 4/30 439/100 |
| D721,652 | S | 1/2015 | Smith | |
| D722,966 | S | 2/2015 | Smith | |
| 8,979,557 | B2 * | 3/2015 | Dinh | H02G 3/0691 174/78 |
| 9,000,310 | B2 | 4/2015 | Smith | |
| 9,012,791 | B2 | 4/2015 | Smith | |
| D733,064 | S | 6/2015 | Smith | |
| D749,047 | S | 2/2016 | Smith | |
| 9,257,795 | B2 | 2/2016 | Smith | |
| 9,705,256 | B1 * | 7/2017 | Smith | H01R 13/648 |
| 2011/0287643 | A1 * | 11/2011 | Lopez | H02G 3/0616 439/100 |
| 2013/0089994 | A1 | 4/2013 | Smith | |
| 2013/0133943 | A1 | 5/2013 | Smith et al. | |
| 2014/0339824 | A1 | 11/2014 | Kang | |
| 2015/0053476 | A1 | 2/2015 | Smith | |
| 2015/0053477 | A1 | 2/2015 | Smith | |
| 2016/0240287 | A1 | 8/2016 | Thomas | |
| 2017/0201045 | A1 * | 7/2017 | Smith | H01R 13/648 |

* cited by examiner

THREADLESS GROUNDING BUSHING WITH REMOVABLE SPACER

CROSS REFERENCE TO RELATED APPLICATION

This application is a continuation-in-part of co-pending patent application Ser. No. 15/584,547 filed on May 2, 2017, which application is hereby incorporated by reference in its entirety. This continuation-in-part application claims domestic priority under all applicable sections of 35 U.S.C. § 120.

TECHNICAL FIELD

The present invention relates to the field of electrical bushings, specifically threadless grounding bushings.

BACKGROUND OF THE INVENTION

Bushings are typically installed at the end of an electrical conduit, including electrical metallic tubing (EMT) and rigid conduit. Bushings are installed at the end of such EMT or conduit to prevent electrical conductors within the EMT or conduit from chafing in the region where the conductors exit the tubing or conduit.

Grounding bushings are used so that the EMT or conduit may be grounded or provided with a path to ground as required by various electrical codes.

It is known in the industry that various trade sizes for EMT and rigid conduit ostensibly having the same outer diameter (OD) may nevertheless have significant variations in the OD especially between EMT and rigid conduit having the same trade size, particularly for trade sizes of two inches and below. Such EMT and rigid conduit are used in various electrical installations, including in solar panel applications, where the conductors are typically low voltage conductors associated with such solar panels. Various electrical codes require that the EMT or rigid conduit maintain proper grounding and therefore there is a need for grounding bushings to meet the code requirements for such installations.

Because of the trade size variation in OD between EMT and rigid conduit, there has been a need for a grounding bushing which can accommodate the variation in the OD for EMT and rigid conduit for the same trade size.

SUMMARY OF THE INVENTION

The present invention relates to a threadless grounding bushing for placement on an end of an electrical metallic tubing (EMT) or an end of a rigid electrical conduit, comprising a metal bushing body, cylindrical in shape, having a first portion with an inner smooth cylindrical surface extending inwardly from a first end of the metal bushing body, the inner smooth cylindrical surface having a radius of curvature dimensioned for receipt of a rigid electrical conduit, the metal bushing body further having second portion positioned adjacent the inner smooth cylindrical surface, the second portion having a central bore for the passage of conductors therethrough, the second portion dimensioned so as to form a stop relative to a terminating end of a rigid conduit or EMT received in the inner smooth cylindrical surface of said first portion, the first portion having at least one threaded hole for receipt of a screw so as to make mechanical and electrical contact with the EMT or rigid conduit when the EMT or rigid conduit is received in the inner smooth cylindrical surface of said first portion, a lug having an opening, the lug secured to the metal bushing body so as to make mechanical and electrical contact to the metal bushing body, a retaining screw threaded into said lug and extending into the opening so as to secure a ground conductor thereto, and a removable spacer having a shape that is a section of a cylinder, the removable spacer having an inner smooth surface with a radius of curvature substantially corresponding to a radius of curvature of an outer surface of an EMT, the removable spacer also having an outer smooth surface corresponding to the radius of curvature of the inner smooth cylindrical surface of the first portion of the metal bushing body.

Another embodiment of the present invention is the grounding bushing as described above, wherein the removable spacer includes a post extending from the outer surface of the removable spacer, the post dimensioned for insertion into an aperture formed in the inner smooth cylindrical surface of the first portion of the metal bushing body.

Another embodiment of the present invention is the grounding bushing as described above, wherein the aperture passes through the first portion of the metal bushing body.

A further embodiment of the present invention is the grounding bushing as described above, wherein the removable spacer further includes a slot formed therein dimensioned for insertion of a tool between the removable spacer and the inner smooth cylindrical surface of the first portion of the metal bushing body so as to assist in removal of the spacer from the metal bushing body.

A further embodiment of the present invention is the grounding bushing as described above, further including an insulating ring positioned at a second end of the metal bushing body so as to minimize conductor chafing for conductors emanating out of an EMT or rigid conduit received in the first portion.

A still further embodiment of the present invention is the grounding bushing as described above, wherein the insulating ring is fabricated from plastic.

Another embodiment of the present invention is the grounding bushing as described above, wherein the insulating ring is L-shaped and further positioned against an internal ridge of the second portion forming said stop.

A further embodiment of the present invention is the grounding bushing as described above, wherein the lug is secured to a rib formed on an outer surface of the metal bushing body.

A still further embodiment of the present invention is the grounding bushing as described above, wherein the second portion is cylindrical in shape with a radius of curvature smaller than the radius of curvature of the inner smooth cylindrical surface of the portion of the metal bushing body.

Another embodiment of the present invention is the grounding bushing as described above, wherein the lug is secured to the metal bushing body by a fastener threadedly engaged with a threaded hole in the metal bushing body, thereby allowing the lug to be rotatably positioned relative to the metalbushing body.

Another embodiment of the present invention is the grounding bushing as described above, wherein the lug has a serrated bottom portion to facilitate mechanical and electrical securement to the metal bushing body.

Another embodiment of the present invention is the grounding bushing as described above, wherein the at least one threaded hole in the first portion is two threaded holes for receipt of two screws so as to facilitate alignment of the EMT with the central bore of the second portion.

BRIEF DESCRIPTION OF THE DRAWINGS

For a further understanding of the nature and objects of the present invention, reference is made to the following detailed description in conjunction with following drawings in which.

DETAILED DESCRIPTION

Figure 1:
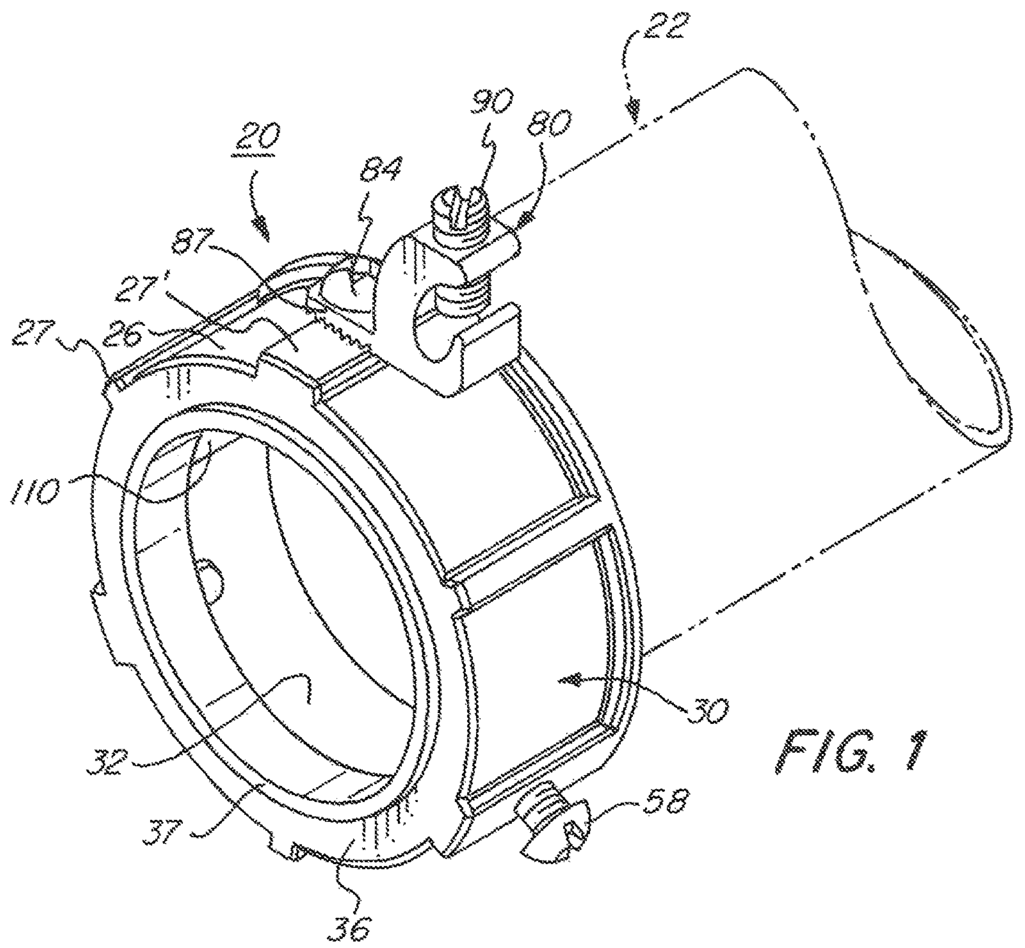
FIG. 1 is a front perspective view of an embodiment of a grounding bushing with a removable spacer according to the present invention, showing an EMT in phantom.
Figure 2:
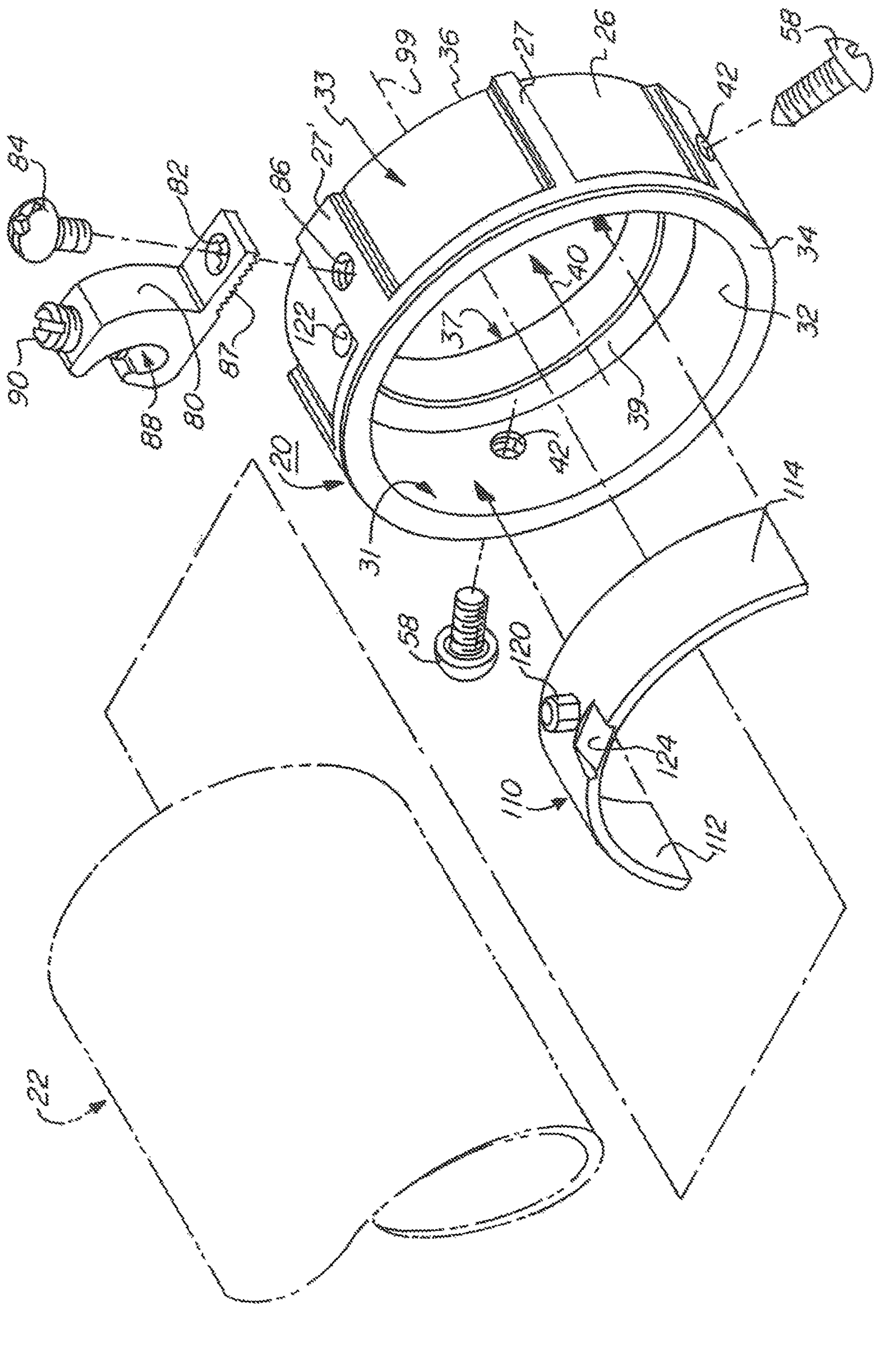
FIG. 2 is an exploded rear perspective view of the grounding bushing with removable spacer, with the spacer outside the bushing and showing an EMT in phantom.
Figure 10:
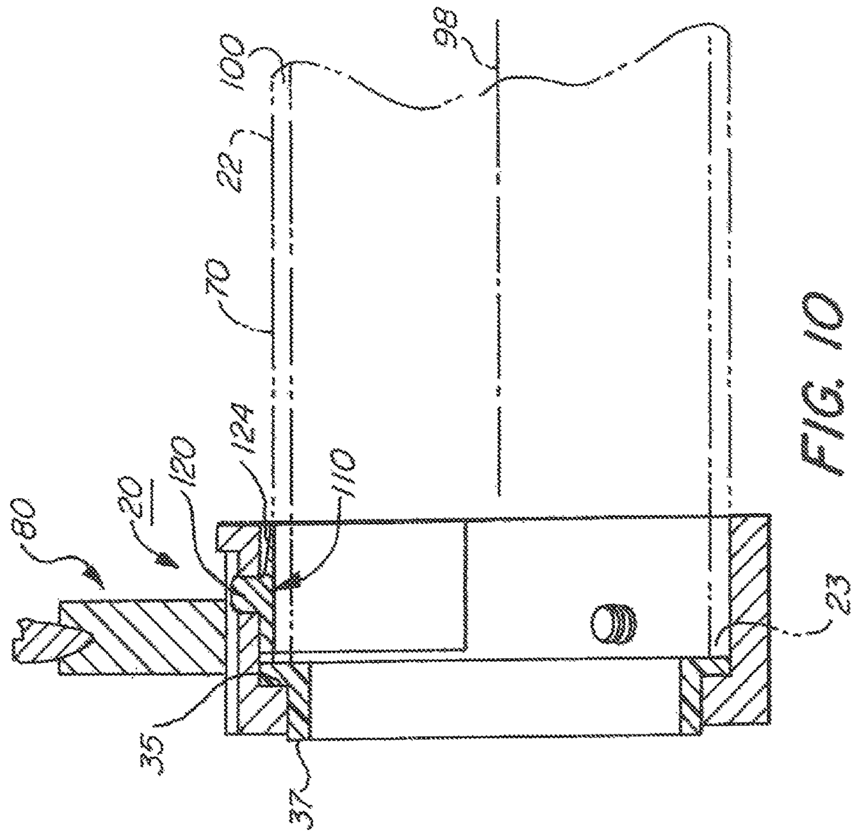
FIG. 10 is a cross-section view of the grounding bushing with the EMT installed taken along line 10-10 of FIG. 9.
Figure 12:
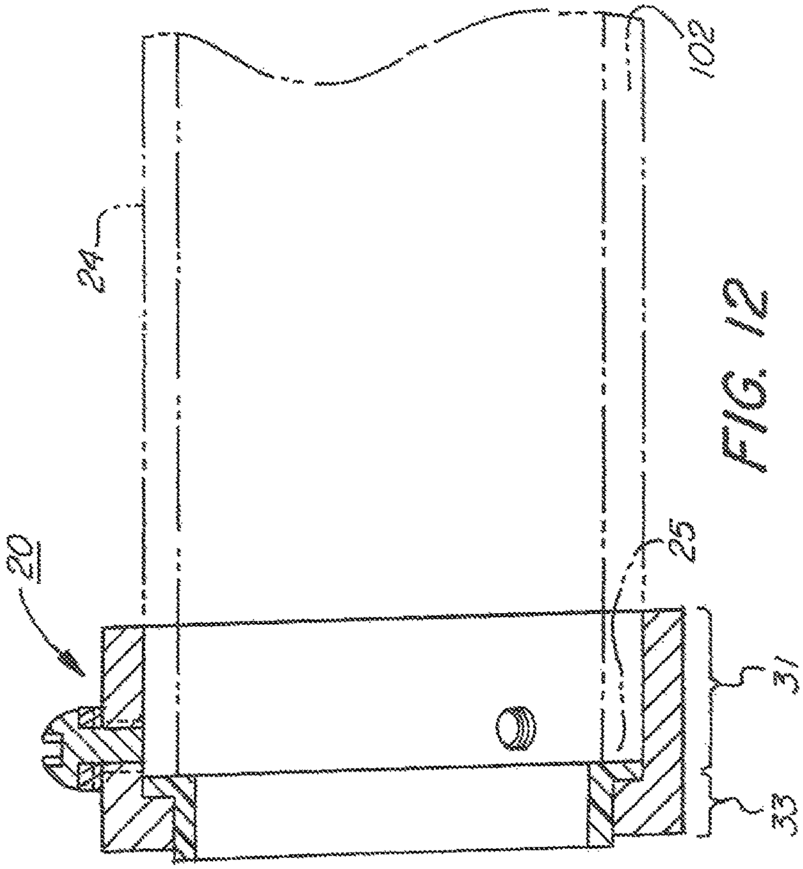
FIG. 12 is a cross-sectional view of the grounding bushing with a rigid conduit installed taken along line 12-12 of FIG. 11.

As seen in FIGS. 1 and 2, a grounding bushing 20 according to an embodiment of the present invention is designed for placement on an end 23 of an electrical metallic tubing (EMT) 22 as seen in FIG. 10, as well as for placement on an end 25 of a rigid electrical conduit 24 as seen in FIG. 12. It is known in the industry that EMT's are typically thin walled as compared to the wall thickness of comparably sized rigid conduit.

Figure 3:
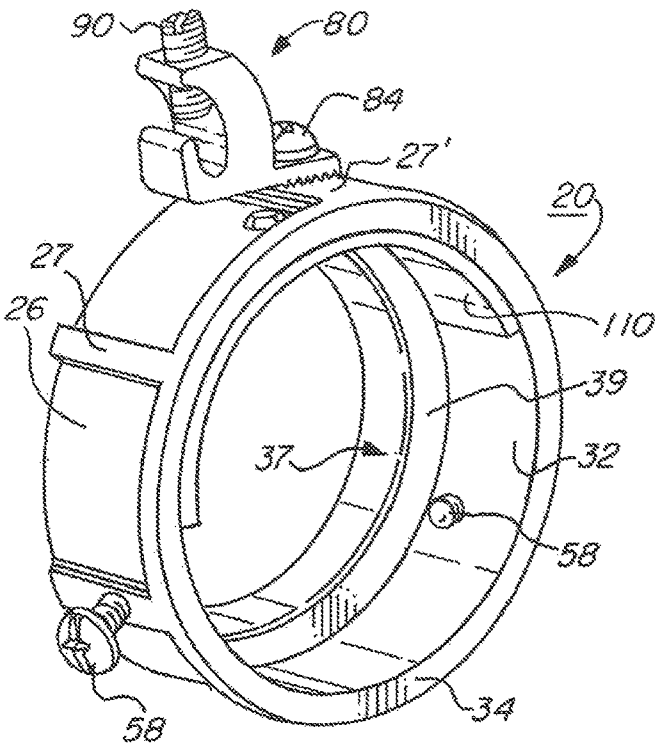
FIG. 3 is a rear perspective view of the grounding bushing showing the removable spacer installed in the metal bushing body.
Figure 3A:
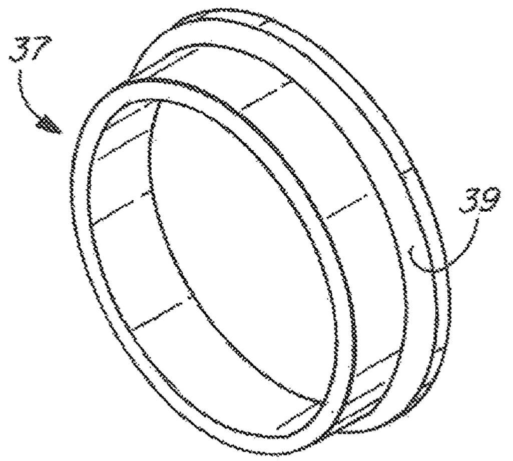
FIG. 3A is a perspective view of the insulating ring seen in FIGS. 1-3.
Figure 4:
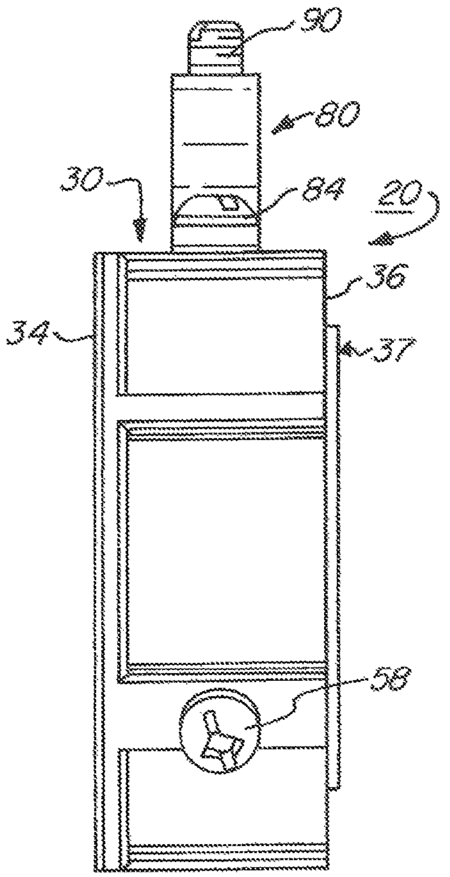
FIG. 4 is a side view of the grounding bushing.
Figure 5:
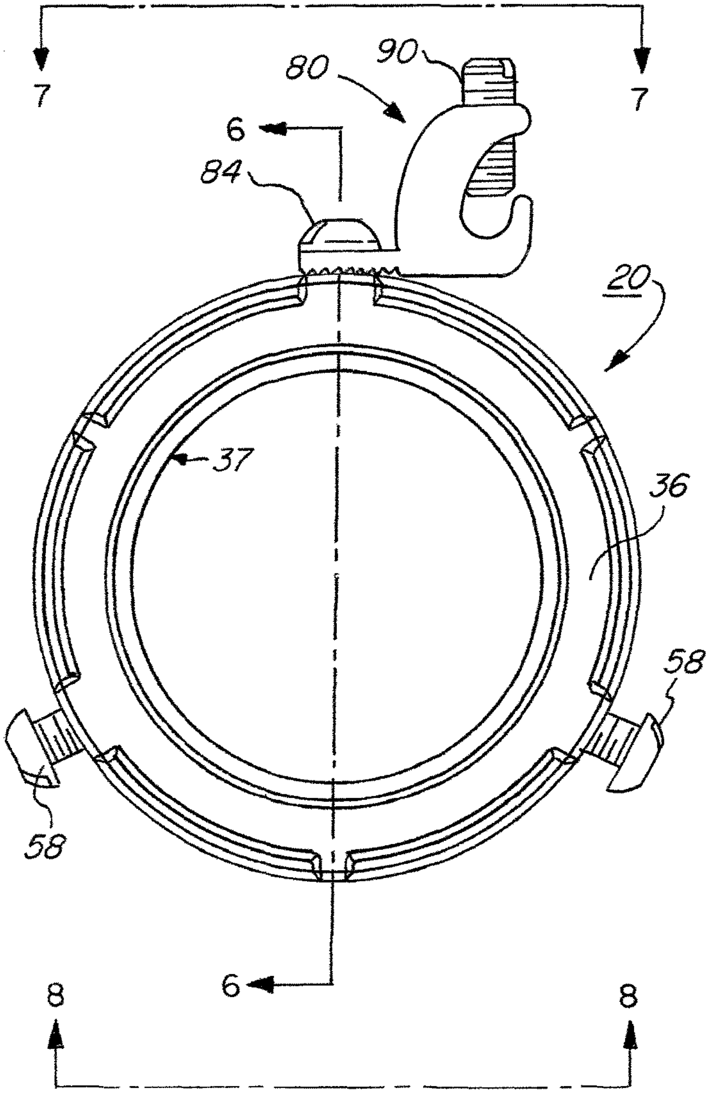
FIG. 5 is a rear view of the grounding bushing.
Figure 6:
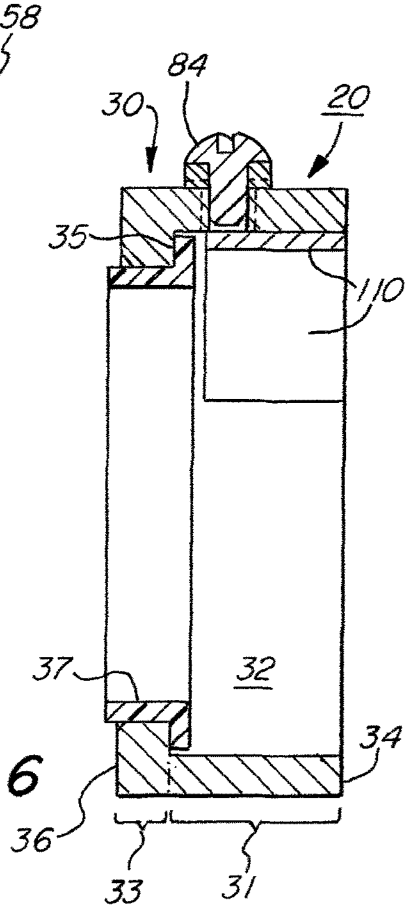
FIG. 6 is a cross-sectional view of the grounding bushing with removable spacer taken along line 6-6 of FIG. 5.
Figure 7:
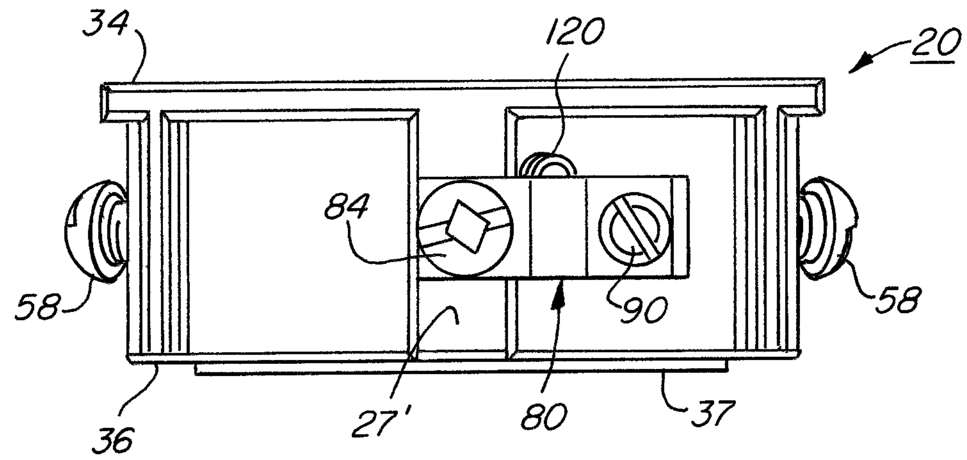
FIG. 7 is a top view of the grounding bushing taken along line 7-7 of FIG. 5.
Figure 8:
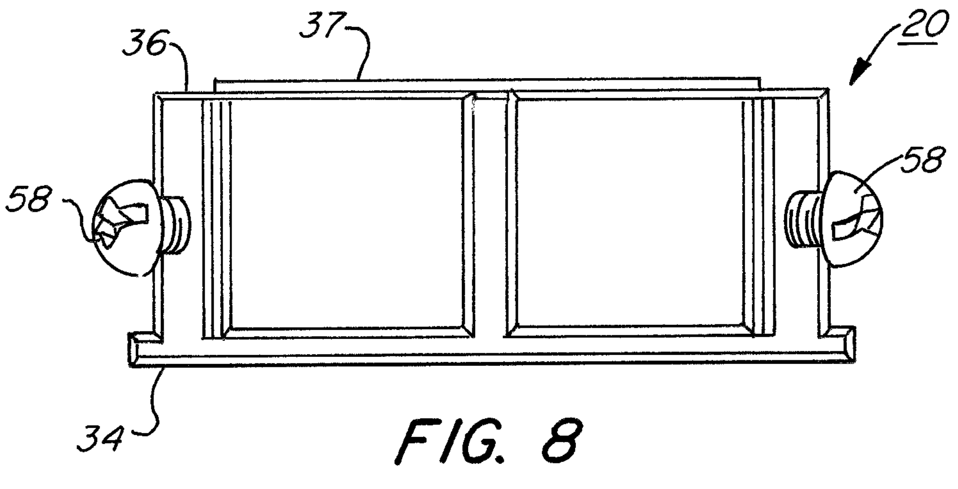
FIG. 8 is a bottom view of the grounding bushing taken along line 8-8 of FIG. 5.

As best seen in FIGS. 1-3, the grounding bushing has a metal bushing body 30. The metal bushing body is generally cylindrical in shape with an outer surface 26 that may have longitudinal ribs 27. The metal bushing body is hollow with a first portion 31 having an inner smooth cylindrical surface 32 that is threadless (no internal threads) having a radius of curvature dimensioned for receipt of a rigid electrical conduit 24 (see FIG. 12). The inner smooth cylindrical surface extends inwardly from a first end 34 of the metal bushing body sufficient to secure an end of an EMT or rigid conduit. The metal bushing body also has a second portion 33 with a central bore 40 (see arrow 40) for the passage of conductors therethrough associated with the EMT or rigid conduit to which the bushing is attached. The second portion has an internal ridge 35 that forms a stop to an EMT or rigid conduit inserted into first portion 31. In an embodiment as seen in FIGS. 1, 10 and 12, a flange 39 of an insulating ring 37 can be in contact with ridge 35. FIG. 3A is a perspective view of the insulating ring. The ring minimizes chafing of conductors emanating from second end 36 of bushing 30. The insulating ring is fabricated from an electrical insulating material, such as plastic.

In the embodiment shown in FIGS. 1-3, 10 and 12, ridge 35 is cylindrical in shape with a radius of curvature smaller than the radius of curvature of first portion 31. The shape of ridge 35 need not be cylindrical (e.g., it could be segments of a cylinder) as long as it can form a stop for the end of an EMT or rigid conduit placed within first portion 31. Although insulating ring 37 is shown as L-shaped with a flange 39 between second portion 33 and the end of the EMT or rigid conduit, it can also be press fit in the bore of second portion 33 without the flange or may have a generally U-shape that snaps over second end 36 of the metal bushing body 30. The metal bushing body is preferably fabricated from steel or any suitable electrically conductive metal known in the art. It may be a zinc die cast body.

Figure 9:
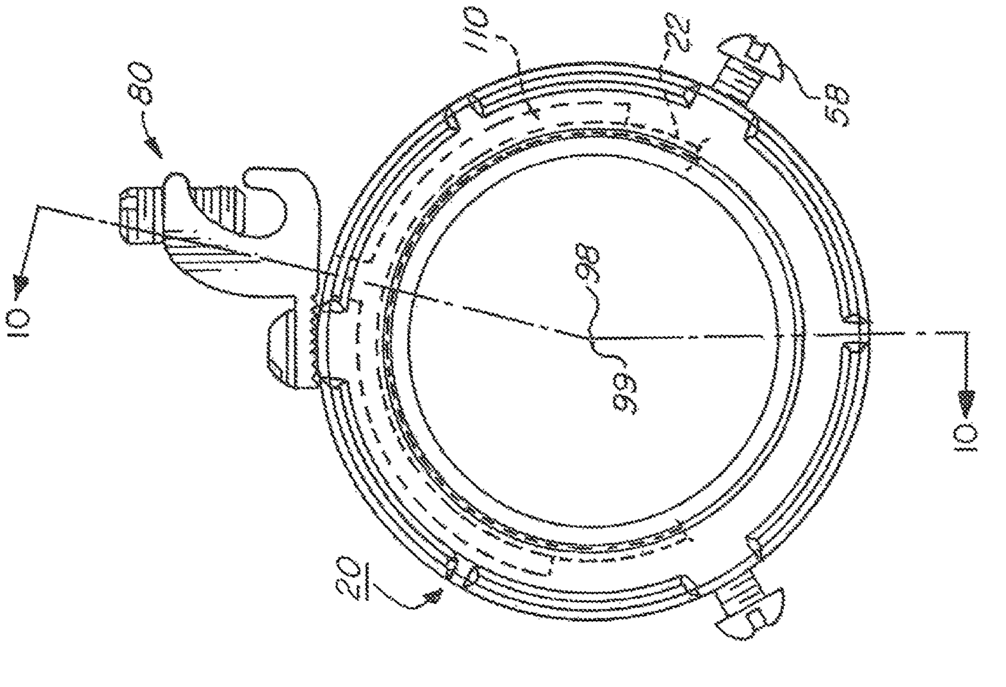
FIG. 9 is a front view of the grounding bushing showing in phantom a portion of an EMT thin wall conduit installed.

The metal bushing body 30 includes threaded holes 42 passing through the metal bushing body for receipt of set screws 58. As seen in FIG. 9, these set screws help center an EMT positioned in the bushing and provide mechanical and electrical contact between the EMT and the bushing. This is seen by EMT phantom centerline 98 and bushing centerline 99 (see FIGS. 2, 9 and 10). These set screws similarly provide mechanical and electrical contact between a rigid conduit positioned in the bushing and the metal bushing body as shown in FIG. 11.

In many electrical installations such as those associated with low voltage wiring used for solar panels and the like, it is required that the EMT or rigid conduit be grounded. To facilitate this, the grounding bushing includes a lug 80 with a hole 82 formed therein so as to mechanically and electrically secure the lug to the metal bushing body by means of a fastener 84 threadedly engaging a threaded hole 86 formed in the metal bushing body. The lug may therefore be rotatably positioned relative to the metal bushing body. The threaded hole may be formed in a rib 27' formed in the outer surface 26 of metal bushing body 30. This rib 27' may be larger than the other ribs on the outer surface of metal bushing body 30. The lug includes an opening 88 dimensional for receipt of a grounding conductor (not shown) which is secured to the lug, and thus to the grounding bushing, by a fastener 90 threadedly engaged within a threaded hole passing through the lug as seen in FIGS. 1 and 2. Rotatable positioning of the lug relative to the metal bushing body can facilitate securement of a grounding conductor to the lug. The lug is electrically conductive, preferably fabricated from aluminum. It may have a serrated bottom portion 87 to help maintain a desired orientation relative to the metal bushing body 30 when secured thereto by fastener 84.

Figure 11:
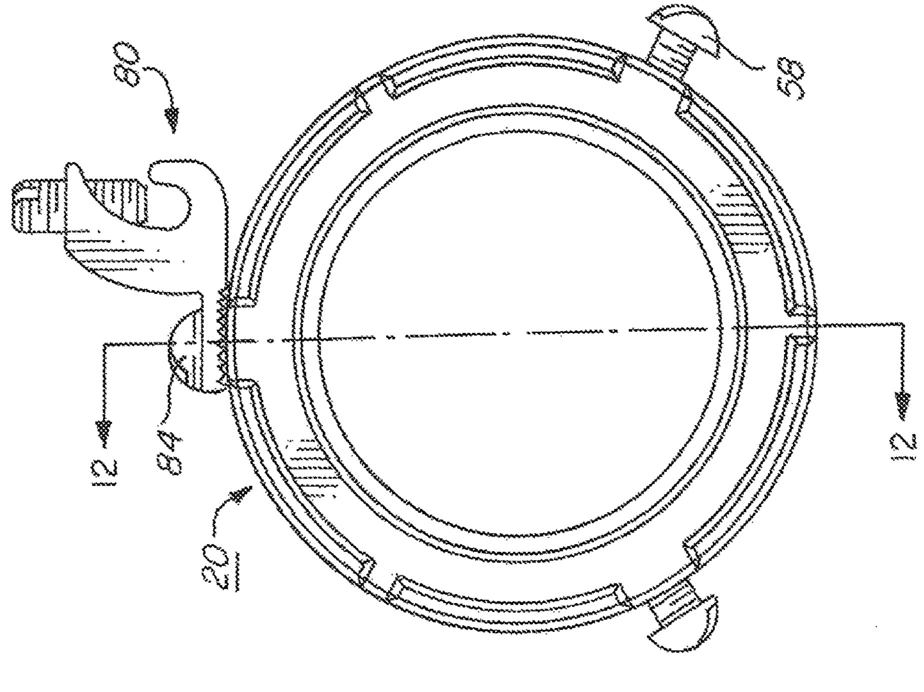
FIG. 11 is a front view of the grounding bushing showing in phantom a rigid conduit installed.

As can best be seen in FIGS. 9 and 10 for an EMT and FIGS. 11 and 12 for a rigid conduit, the EMT typically has a thinner wall thickness 100 as compared to the wall thickness 102 of the rigid conduit 24. For trade sizes two inches and less, the OD of EMT is typically less than the OD for a comparable rigid conduit.

The present invention as seen in FIGS. 1-3 and 9-12 addresses this problem in the art since the grounding bushing further including a removable spacer 110. This removable spacer when secured to the first portion 31 of metal bushing body 30, allows the grounding bushing to make secure contact with the outer surface 70 of the EMT as best seen in FIG. 10.

For placement of the grounding bushing on a rigid conduit as seen in FIGS. 11 and 12, the removable spacer is removed; thereby allowing the grounding bushing to accommodate the larger OD of the rigid conduit as compared to the OD of the comparably sized EMT. As best seen in FIG. 2, the removable spacer has a shape that is a section of a cylinder, the removable spacer having an inner smooth surface 112 with a radius of curvature substantially corresponding to the radius of curvature of the outer surface 70 of the EMT (see FIG. 10). The removable spacer has an outer surface 114 corresponding to a radius of curvature of the inner smooth cylindrical surface 32 of the first portion 31 grounding bushing 20 (see FIG. 2). Thus, the removable spacer accommodates a space between the outer surface 70 of the EMT and the inner surface 32 of the first portion 31; thereby providing a snug fitment of the grounding bushing onto the EMT as shown in FIGS. 9 and 10. As seen in FIGS. 2, 9 and 10, this arrangement also helps keep the centerline 99 of the bushing on or near the centerline 98 of the EMT via adjustment of set screws 58.

The shape of the removable spacer can vary as long as it accommodates the space between outer surface 70 of the EMT and inner surface 32 of the first portion 31 of bushing 20. Of course, the removable spacer can also be used to accommodate variation in OD's that may occur from sample to sample of EMT or from sample to sample of rigid conduit. Such sample OD variation is more common in larger trade size (greater than 2½" OD) EMT and rigid conduit.

To facilitate securement of the removable spacer 110 to the bushing, the removable spacer includes a post 120 as best seen in FIGS. 2, 3 and 10. This post is positioned on the outer surface 114 of the removable spacer so as to pass into an aperture 122 of the first portion. The aperture may extend through the first portion.

The removable spacer also includes a slot 124 as best seen in FIGS. 2 and 10. The slot provides for easy insertion of a tool, such as the blade of a screwdriver (not shown), so as to remove the removable spacer before installation of the grounding bushing onto a rigid conduit or the like, where the outer diameter of the rigid conduit requires the full diameter of the grounding bushing in order to secure the grounding bushing to the rigid conduit. This is best seen in FIGS. 11 and 12. The removable spacer is preferably fabricated from metal, such as zinc alloy.

Of course, other means of attaching the removable spacer to the grounding bushing could be used, such as a press fitment or the like without the use of a post. Variations in the removable spacer can also be made to facilitate removal of the removable spacer from the bushing if desired, such as elimination of the slot and providing for flexible bending of the removable spacer so as to facilitate removal from the bushing.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A threadless grounding bushing for placement on an end of an electrical metallic tubing (EMT) or an end of a rigid electrical conduit, comprising:

a metal bushing body, cylindrical in shape, having a first portion with an inner smooth cylindrical surface extending inwardly from a first end of the metal bushing body, the inner smooth cylindrical surface having a radius of curvature dimensioned for receipt of the rigid electrical conduit, the metal bushing body further having second portion positioned adjacent the inner smooth cylindrical surface, the second portion having a central bore for the passage of conductors therethrough, the second portion dimensioned so as to form a stop relative to a terminating end of the rigid conduit or EMT received in the inner smooth cylindrical surface of said first portion, the first portion having at least one threaded hole for receipt of a screw so as to make mechanical and electrical contact with the EMT or rigid conduit when the EMT or rigid conduit is received in the inner smooth cylindrical surface of said first portion, a lug having an opening, the lug secured to the metal bushing body so as to make mechanical and electrical contact to the metal bushing body, a fastener threaded into said lug and extending into the opening so as to secure a ground conductor thereto, and a removable spacer having a shape that is a section of a cylinder, the removable spacer having an inner smooth surface with a radius of curvature substantially corresponding to a radius of curvature of an outer surface of the EMT, the removable spacer also having an outer smooth surface corresponding to the radius of curvature of the inner smooth cylindrical surface of the first portion of the metal bushing body.

2. The grounding bushing according to claim 1, wherein the removable spacer includes a post extending from the outer surface of the removable spacer, the post dimensioned for insertion into an aperture formed in the inner smooth cylindrical surface of the first portion of the metal bushing body.

3. The grounding bushing according to claim 2, wherein the aperture passes through the first portion of the metal bushing body.

4. The grounding bushing according to claim 2, wherein the removable spacer further includes a slot formed therein dimensioned for insertion of a tool between the removable spacer and the inner smooth cylindrical surface of the first portion of the metal bushing body so as to assist in removal of the removable spacer from the metal bushing body.

5. The grounding bushing according to claim 4, further including an insulating ring positioned at a second end of the metal bushing body so as to minimize conductor chafing for conductors emanating out of an EMT or rigid conduit received in the first portion.

6. The grounding bushing according to claim 5, wherein the insulating ring is fabricated from plastic.

7. The grounding bushing according to claim 4, wherein the insulating ring is L-shaped and further positioned against an internal ridge of the second portion forming said stop.

8. The grounding bushing according to claim 2, further including an insulating ring positioned at a second end of the metal bushing body so as to minimize conductor chafing for conductors emanating out of an EMT or rigid conduit received in the first portion.

9. The grounding bushing according to claim 8, wherein the insulating ring is fabricated from plastic.

10. The grounding bushing according to claim 2, wherein the lug is secured to a rib formed on an outer surface of the metal bushing body.

11. The grounding bushing according to claim 1, wherein the second portion is cylindrical in shape with a radius of curvature smaller than the radius of curvature of the inner smooth cylindrical surface of the portion of the metal bushing body.

12. The grounding bushing according to claim 11, further including an insulating ring positioned at a second end of the metal bushing body so as to minimize conductor chafing for conductors emanating out of an EMT or rigid conduit received in the first portion.

13. The grounding bushing according to claim 12, wherein the insulating ring is fabricated from plastic.

14. The grounding bushing according to claim 1, wherein the removable spacer further includes a slot formed therein dimensioned for insertion of a tool between the removable spacer and the inner smooth cylindrical surface of the first portion of the metal bushing body so as to assist in removal of the removable spacer from the metal bushing body.

15. The grounding bushing according to claim 1, further including an insulating ring positioned at a second end the metal bushing body so as to minimize conductor chafing for conductors emanating out of an EMT or rigid conduit received in the first portion.

16. The grounding bushing according to claim 1, wherein the lug is secured to a rib formed on an outer surface of the metal bushing body.

17. The grounding bushing according to claim 1, wherein the lug is secured to the metal bushing body by a fastener threadedly engaged with a threaded hole in the metal bushing body, thereby allowing the lug to be rotatably positioned relative to the metal bushing body.

18. The grounding bushing according to claim 17, wherein the lug has a serrated bottom portion to facilitate mechanical and electrical securement to the metal bushing body.

19. The grounding bushing according to claim 1, wherein the at least one threaded hole in the first portion is two threaded holes for receipt of two screws so as to facilitate alignment of the EMT with the central bore of the second portion.

20. The grounding bushing according to claim 1, wherein the removable spacer is fabricated from metal.

21. The grounding bushing according to claim 20, wherein the removable spacer includes a post extending from the outer surface of the removable spacer, the post dimensioned for insertion into an aperture formed in the inner smooth cylindrical surface of the first portion of the metal bushing body.

22. The grounding bushing according to claim 21, wherein the aperture passes through the first portion of the metal bushing body.

23. The grounding bushing according to claim 22, wherein the removable spacer further includes a slot formed therein dimensioned for insertion of a tool between the removable spacer and the inner smooth cylindrical surface of the first portion of the metal bushing body so as to assist in removal of the removable spacer from the metal bushing body.

24. The grounding bushing according to claim 21, wherein the removable spacer further includes a slot formed therein dimensioned for insertion of a tool between the removable spacer and the inner smooth cylindrical surface of the first portion of the metal bushing body so as to assist in removal of the removable spacer from the metal bushing body.

25. The grounding bushing according to claim 20, wherein the lug is secured to a rib formed on an outer surface of the metal bushing body.

26. The grounding bushing according to claim 20, wherein the lug is secured to the metal bushing body by a fastener threadedly engaged with a threaded hole in the metal bushing body, thereby allowing the lug to be rotatably positioned relative to the metal bushing body.

27. The grounding bushing according to claim 20, wherein the metal is zinc alloy.

28. The grounding bushing according to claim 20, further including an insulating ring positioned at a second end of the metal bushing body so as to minimize conductor chafing for conductors emanating out of an EMT or rigid conduit received in the first portion.

* * * * *